Jan. 7, 1958     T. P. DUSENBURY     2,819,067
CHECK SHINGLING MACHINE
Filed Dec. 22, 1955                 6 Sheets-Sheet 1
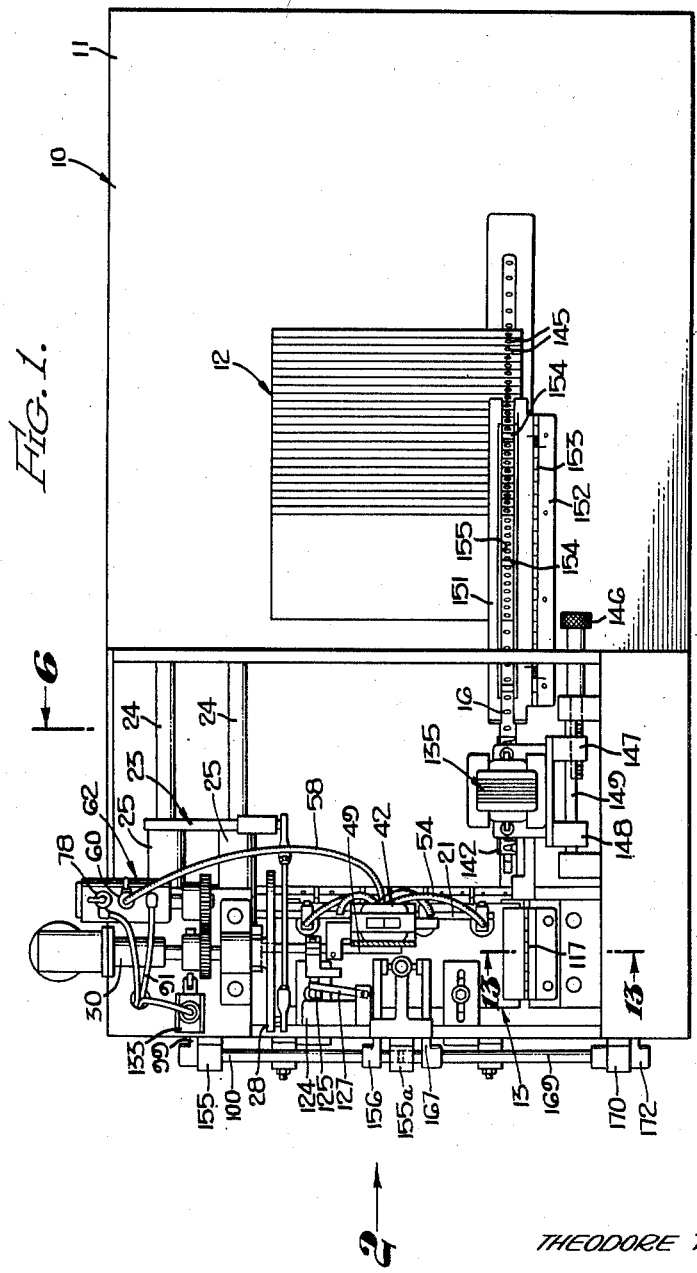
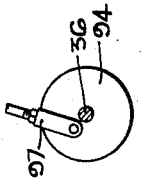
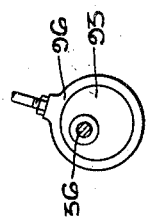
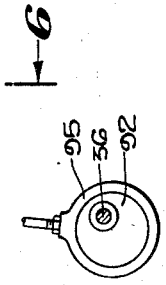
THEODORE P. DUSENBURY,
INVENTOR.
BY *Lyon & Lyon*
ATTORNEYS

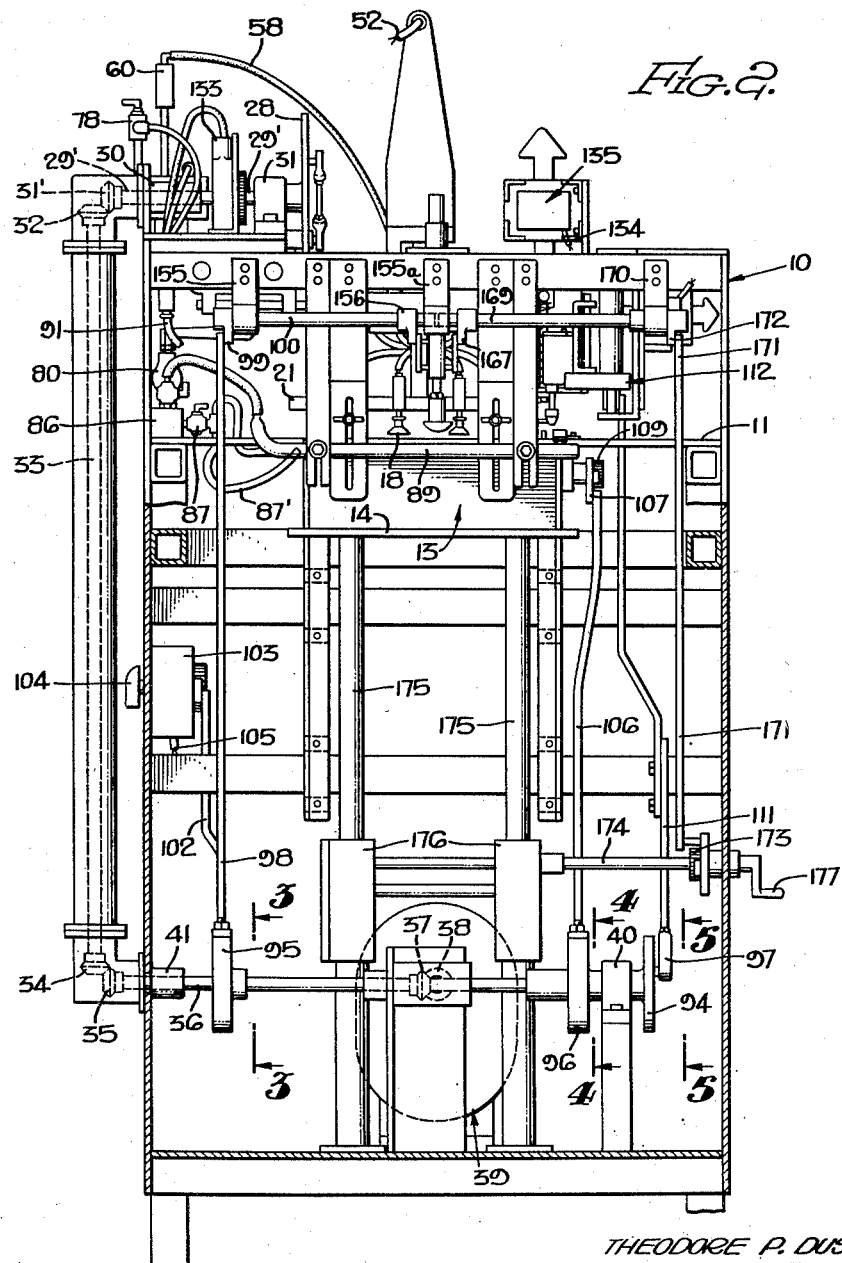

Jan. 7, 1958

T. P. DUSENBURY 2,819,067

CHECK SHINGLING MACHINE

Filed Dec. 22, 1955

THEODORE P. DUSENBURY,
INVENTOR.

BY *Lyon & Lyon*

ATTORNEYS

Jan. 7, 1958  T. P. DUSENBURY  2,819,067
CHECK SHINGLING MACHINE
Filed Dec. 22, 1955  6 Sheets-Sheet 4

THEODORE P. DUSENBURY,
INVENTOR.

BY Lyon & Lyon

ATTORNEYS

Jan. 7, 1958   T. P. DUSENBURY   2,819,067
CHECK SHINGLING MACHINE

Filed Dec. 22, 1955   6 Sheets-Sheet 5

THEODORE P. DUSENBURY,
INVENTOR.

BY Lyon & Lyon
ATTORNEYS

Jan. 7, 1958 — T. P. DUSENBURY — 2,819,067
CHECK SHINGLING MACHINE
Filed Dec. 22, 1955 — 6 Sheets-Sheet 6
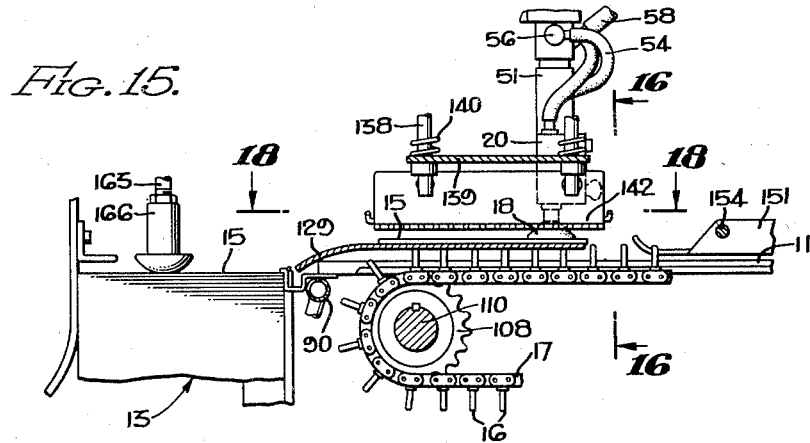
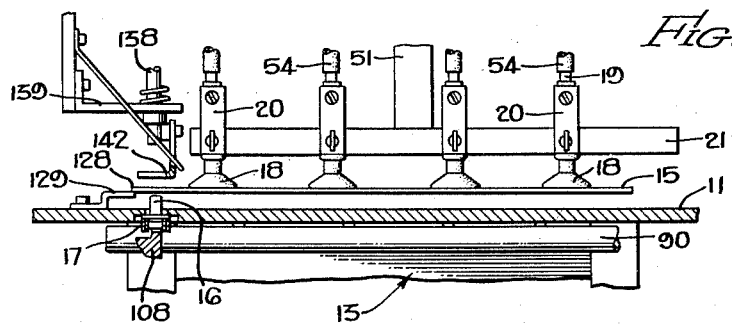
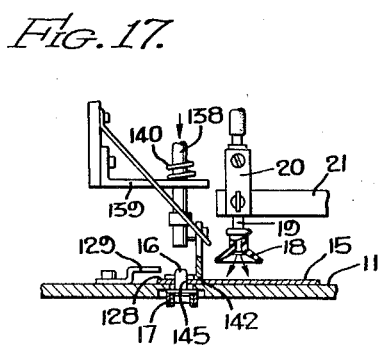
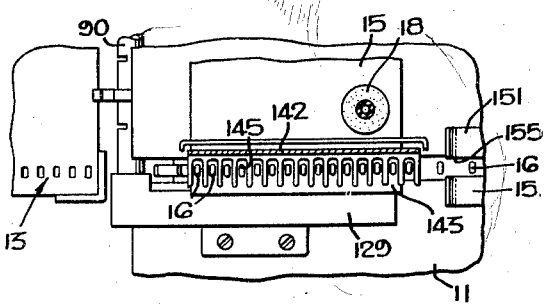
THEODORE P. DUSENBURY,
INVENTOR.
BY Lyon & Lyon
ATTORNEYS United States Patent Office 2,819,067
Patented Jan. 7, 1958

2,819,067

CHECK SHINGLING MACHINE

Theodore P. Dusenbury, Los Angeles, Calif., assignor, by mesne assignments, to Burroughs Corporation, Detroit, Mich., a corporation of Michigan Application December 22, 1955, Serial No. 554,890

5 Claims. (Cl. 270—58)

This invention relates to improvements in sheet handling and collating apparatus and is particularly directed to improvements in a machine for making shingled strips from a stack of sheets, such as, for example, a stack of checks.

This invention relates to improvements over the copending applications of Dusenbury et al., Serial No. 249,884 filed October 5, 1951, Serial No. 402,066 filed January 4, 1954 and Serial No. 499,072 filed April 4, 1955.

The principal object of the present invention is to provide a check shingling machine in which the rapidly reciprocating check-transporting parts are of minimum size and weight, in order that the speed of operation may be substantially increased over that of the devices shown in said applications, Serial Nos. 249,884 and 402,066. Another object is to provide a check shingling machine in which check-transporting suction cups are carried on a laterally projecting support bar which moves them back-and forth, and wherein the suction cups are raised and lowered by electrically driven means carried on the support bar. Other more detailed objects and advantages will appear hereinafter.

In the drawings:

Figure 1 is a top plan view showing a preferred embodiment of this invention.

Figure 2 is an end elevation thereof taken in the direction indicated by the numeral 2 and arrow as shown in Figure 1.

Figures 3, 4 and 5 are detail section views taken substantially upon lines 3—3, 4—4, and 5—5 respectively, as shown on Figure 2.

Figure 6:
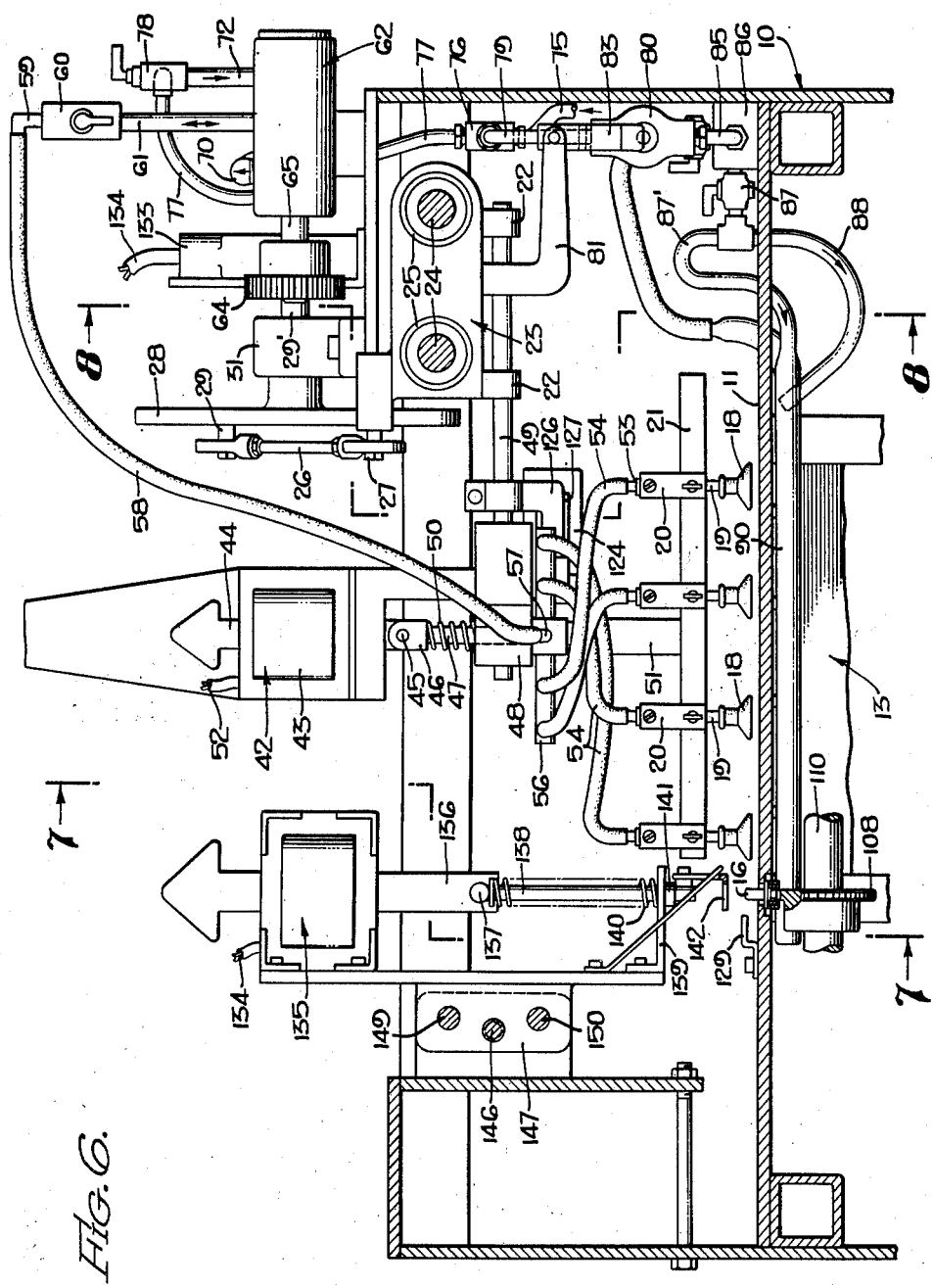

Figure 6 is a sectional end elevation partly in section taken substantially on lines 6—6 as shown in Figure 1.

Figure 7:
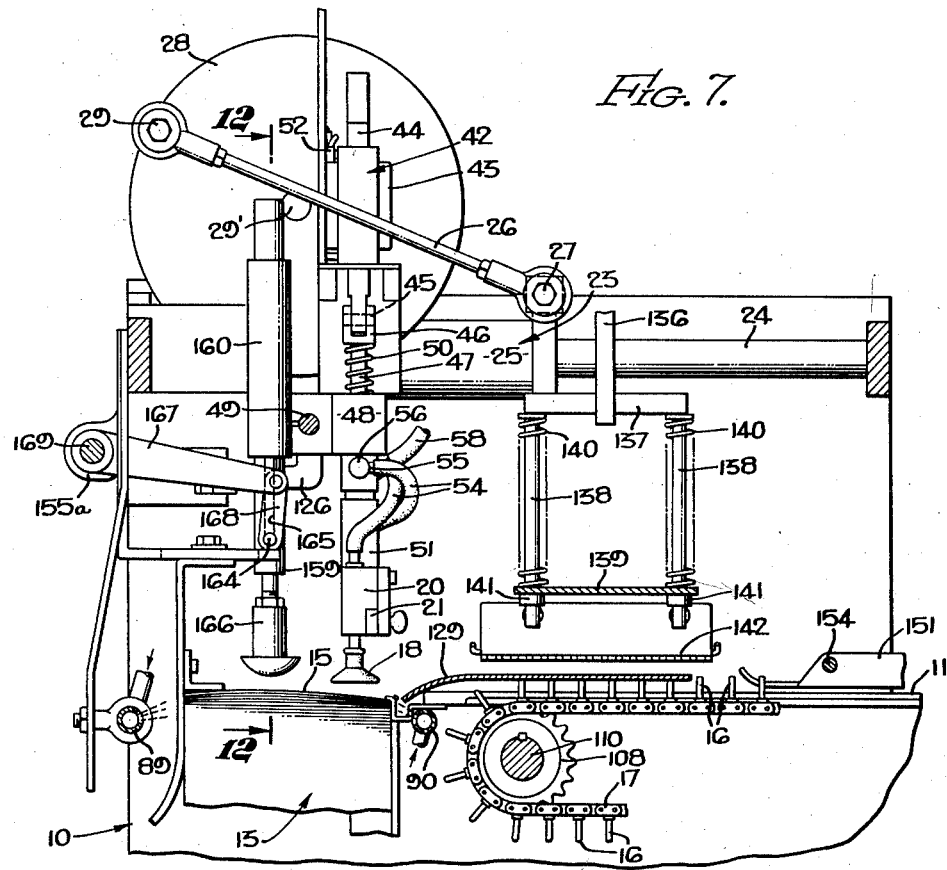

Figure 7 is a side elevation, partly in section, taken substantially on lines 7—7 as shown in Figure 6.

Figure 8:
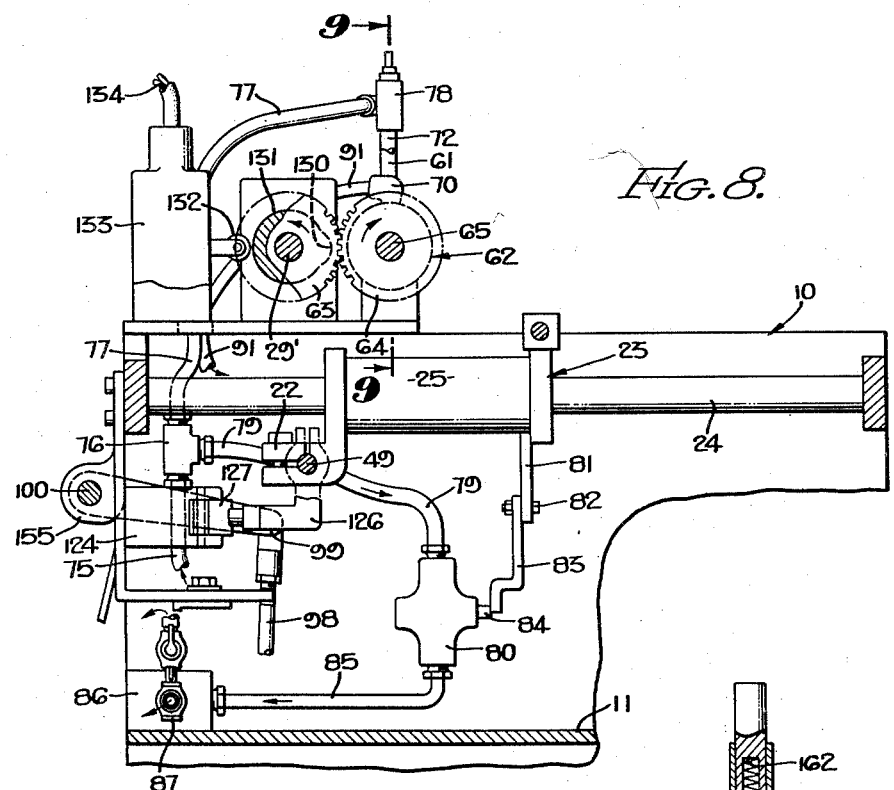

Figure 8 is an end elevation, partly in section, and partly broken away, taken substantially on lines 8—8 as shown in Figure 6.

Figure 9:
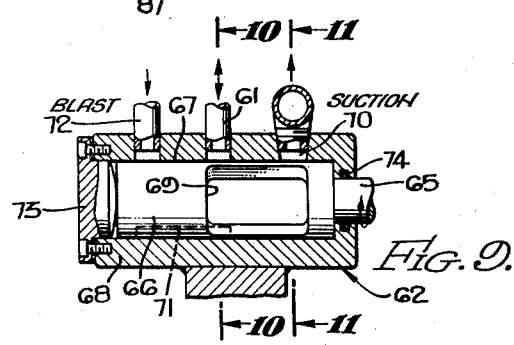

Figure 9 is a sectional detail of the air valve assembly taken substantially on lines 9—9 as shown in Figure 8.

Figures 10, 11:
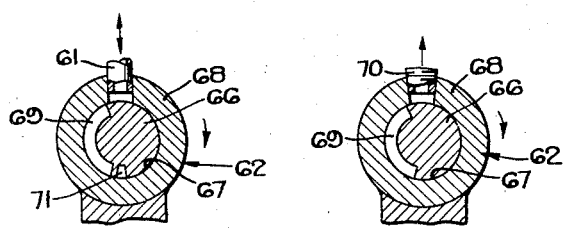

Figures 10 and 11 are transverse sectional views taken on lines 10—10 and 11—11 respectively as shown in Figure 9.

Figure 12:
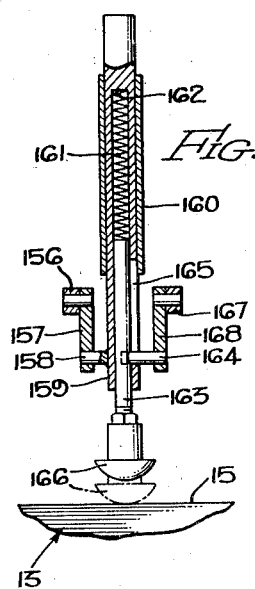

Figure 12 is a sectional end elevation taken substantially on lines 12—12 as shown in Figure 7.

Figure 13:
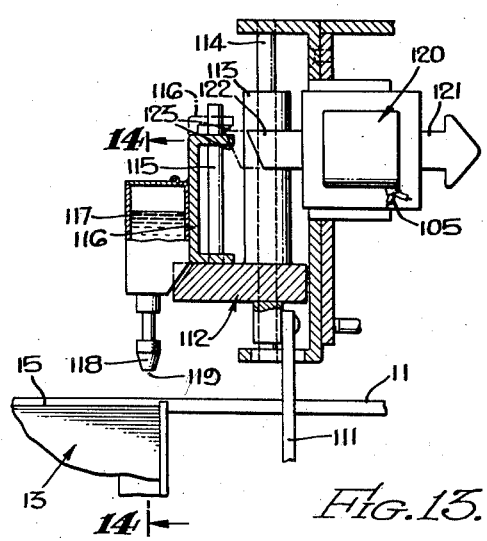

Figure 13 is a sectional end elevation taken substantially on lines 13—13 as shown in Figure 1.

Figure 14:
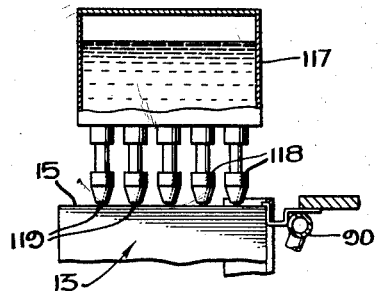

Figure 14 is a sectional detail taken substantially on lines 14—14 as shown in Figure 13.

Figure 15 is a view similar to Figure 7 but showing the parts in a different position.

Figure 16 is a section view taken substantially on lines 16—16 as shown in Figure 15.

Figure 17 is a view similar to Figure 16 but showing the parts in a different position.

Figure 18 is a sectional plan view taken substantially on lines 18—18 as shown in Figure 15.

Referring to the drawings, the stationary box-like frame 10 is provided with a flat horizontal surface forming a table 11. Shingled strips 12, in this case groups of shingled checks, are formed on this table surface 11 from the stack 13 of sheets (checks) resting on the vertically movable platform 14. The mechanism described in detail below serves to transport the sheets 15 one by one from the top of the stack 13 and deposit them in sequence on the table surface 11. Pins 16 carried on an intermittently moving chain 17 serve to move the group of sheets in a step-by-step fashion so that as each new sheet 14 is added to the group it has one exposed edge, and the completely shingled strip comprises sheets in echelon formation as shown in Figure 1.

The check-transporting means comprises a plurality of suction cups 18 each attached to a metallic tube 19 which has vertical sliding movement within a fitting 20. Each of these fittings 20 is adjustably clamped to a support bar 21. The support bar 21 is carried by means described below from a laterally extending bar 49. The bar 49 is rigidly clamped between arms 22 provided on the crosshead 23 which slides back and forth on the stationary parallel guide bars 24. These guide bars 24 are mounted on the frame 10 and are slidably engaged by bearings (not shown) contained within the parallel housings 25 of the crosshead 23.

Means are provided for reciprocating the crosshead 23 on the parallel guide bars 24 and, as shown in the drawings (Fig. 6) this means includes a pitman 26 pivotally connected to the crosshead 23 at 27 and pivotally connected to the disc 28 by means of the pivot pin 29. From this description it will be understood that rotation of the disc 28 serves to drive the crosshead 23 back and forth along the guide bars 24. The disc 28 is fixed to a rotary shaft 29' which is mounted in axially spaced bearings 30 and 31. At one end the shaft 29' carries a bevel gear 31' (Fig. 2) and this bevel gear meshes with a similar bevel gear 32 fixed on the upper end of the vertical shaft 33. A similar pair of meshing bevel gears 34 and 35 serve to transmit power from the drive shaft 36 to the vertical shaft 33. The drive shaft 36 is, itself, driven by means of the bevel gears 37 and 38 and the latter gear is driven from the variable speed driving mechanism 39 shown in outline in Figure 2. The drive shaft 36 is supported in suitable bearings 40 and 41 mounted on the frame 10.

Means are provided for raising and lowering the crossbar 21 which carries the suction cups 18. As shown in the drawings (Fig. 6), this means constitutes an electrically operated solenoid assembly 42 having the usual stationary windings 43 and a vertically movable armature 44. The lower end of this armature 44 is pivotally connected at 45 to a clevis 46. The clevis 46 is mounted on the upper end of the vertical rod 47 and this rod is slidably mounted in the guide bushing 48 clamped to the laterally extending bar 49. A coil spring 50 encircles the rod 47 and is confined between the clevis 46 and the upper end of the bushing 48. The lower end of the rod 47 is fixed to the post 51 which carries the crossbar 21 at its lower end. From this description it will be understood that when electrical energy is supplied to the solenoid 42 through the wiring 52, the armature 44 is raised and this serves to lift the rod 47, post 51, crossbar 21 and fittings 20. When the upper ends of the fittings 20 contact the shoulders 53 formed on the metallic tubes 19, the suction cups 18 are also raised. The parts are then in the raised position as shown in Figure 6. When electric energy is cut off, the armature 44 of the solenoid assembly 42 drops by gravity, assisted by the spring 50, and allows the suction cups 18 to descend to rest upon the uppermost sheet in the stack 13.

Air pressure and suction pressure are alternately delivered to the suction cups 18. Air pressure in the form of a short blast is delivered to the interior of the cups to enable them to deposit a sheet 15 onto the table surface 11 in forming the shingled strip 12. Suction pressure is delivered to the interior of the suction cups 18 to enable them to grip and lift the uppermost sheet from the stack 13 and transport it to the desired position on the table surface 11. Each of the metallic tubes 19 is connected to a short length of flexible hose 54 and this hose connects with one of a plurality of lateral fittings 55 provided on the hollow tube 56. This hollow tube projects laterally from each side of the post 51, and the interior of the hollow tube communicates with the central fitting 57 of the post 51. A larger hose 58 connects with the fitting 57 and with the terminal fitting 59 provided on the shutoff valve assembly 60. This valve 60 is normally in open position. A conduit 61 connects the shutoff valve 60 with the distributor valve assembly generally designated 62.

The distributor valve assembly 62, as shown in Figures 6, 8, 9, 10 and 11, is driven by gearing 63, 64 from the rotary shaft 29'. The driven shaft 65 is formed integrally with a rotary valve 66 mounted within the bore 67 of the housing 68. The valve 66 has a relatively long groove 69 formed therein and which extends for a relatively long arcuate distance. This groove 69 functions to establish communication between the suction port 70 and the conduit 61. Another groove 71 is provided in the valve 66 and this groove also extends for a relatively long distance axially of the valve and overlaps the position of the groove 69, although it does not communicate therewith. The function of the groove 71 is to connect the pressure line 72 with the conduit 61. As the shaft 65 rotates, suction pressure is applied to the conduit 61 for a relatively long time interval and positive air pressure is thereafter applied to the conduit 61 over a relatively short time interval. This sequence continues so long as the shaft 65 is rotated. One end of the housing 68 is closed by the member 73 and the other end is sealed about the shaft 65 by means of suitable sealing rings 74.

Air pressure is supplied through pipe 75 (Fig. 8) to the T fitting 76. One branch line 77 from the fitting 76 extends to the shut-off cock 78 which communicates with the conduit 72. The shut-off cock is normally open. The other branch line 79 from the T fitting extends to the air valve 80 which is normally closed. The crosshead 23 carries a downwardly and laterally extending bracket 81 which is connected by means of a fastener 82 to a trip finger 83. This finger 83 is adapted to contact the actuating button 84 on the valve 80 and thereby cause air from line 79 to pass outwardly from line 85 into the header 86. A valved outlet 87 from the header communicates with pressure lines 87' and 88 (Fig. 6) which serve to direct jets of air against the uppermost sheets in the stack 13 to separate them at the instant that the crosshead 23 is in its fully retracted position. The air jets issue from the nozzles 89 and 90, as best shown in Figures 7, 14 and 15. When the crosshead 23 moves forward from the retracted position shown in Figure 8, the finger 83 moves away from the actuating button 84, and the valve 80 automatically closes.

The suction line 91 leading from the port and fitting 70 communicates with a source of vacuum pressure (not shown).

The drive shaft 36 is provided with a series of eccentrics 92, 93 and 94 (Figs. 2-5) which are fixed thereon and which cooperate with eccentric straps or followers 95, 96 and 97 to effect various operations in timed sequence. The eccentric strap 95 is connected to rod 98, and the upper end of this rod is pivotally connected to the forward end of a crank 99 as shown in Figure 8. The crank is fixed on a rock shaft 100 carried in suitable bearings 155 and 155a mounted on the frame 10. The rod 98 is also connected to an actuating rod 102 which operates a ratchet assembly 103 having a manually operable selector 104 (Fig. 2). This ratchet assembly contains an electric switch which acts to energize the electrical line 105 whenever a predetermined number of strokes of the actuator rod 102 has occurred. The predetermined number may be selected by means of the selector 104. The eccentric strap 96 is connected to rod 106, and the upper end of this rod is connected to a crank arm 107 which drives the sprocket 108 by means of the ratchet 109 and the shaft 110. The eccentric follower 99 is connected to the two-piece rod 111, and the upper end of this rod serves to raise and lower the slide assembly 112 as shown in Figure 13. This slide assembly includes a sleeve 113 mounted to move vertically on a stationary post 114. The post is fixed to the frame 10 adjacent to the position of the stack of sheets and serves as a vertical guide member for an adhesive applicator. A second post 115 is fixed to the slide assembly 112 and slidably supports a bracket 116 carrying the adhesive reservoir 117. Suitable adhesive, such as glue, is contained within the reservoir 117 and is fed through a series of applicator nozzles 118. Each of these nozzles has a ball check 119 at its lower end which functions to deposit a spot of adhesive on the top surface of the uppermost check 15 in the stack 13. The adhesive reservoir and nozzles 118 overlie the stack of sheets and are raised and lowered as a unit with the slide assembly 112, depositing spots of adhesive on each of the sheets in turn. When the desired number of sheets has been reached for a particular shingled strip, the electric switch within the mechanism 103 energizes the lead wires 105 and causes the solenoid assembly 120 to project its armature 121 to the left, as viewed in Figure 13, and thereby enable trigger 122 to engage under the shoulder 123 on the bracket 116. This action holds the adhesive reservoir 117 in an elevated position so that the nozzles 118 fail to engage the uppermost sheet 15 in the stack 13. Since no adhesive is deposited on that particular sheet, it will form the first sheet in a new shingled strip 12. On the next revolution of the drive shaft 36, the switch within the mechanism 103 opens to de-energize the electrical line 105 and thereby cause the solenoid armature 121 to retract to the inoperative position shown in Figure 13, under the influence of a spring (not shown).

When the support bar 21, hereinafter referred to as the transfer member, is moved to the rearward end of its motion to position the suction cups 18 in the location shown in Figure 7, the solenoid assembly 42 is de-energized to permit the suction cups 18 to contact the uppermost sheet 15 in the stack 13. The switch which interrupts the flow of electrical energy to the solenoid assembly 42 is shown in Figures 6 and 8 and bears the number 124. This switch has an actuating button 125 which is contacted by the rearward end of the actuating finger 126 via the intermediate lever 127. The finger 126 is clamped on the laterally extending bar 49. When the crosshead 23 is in its fully retracted position as shown in Figure 8, the switch button 125 is contacted, thereby interrupting electrical power to the solenoid assembly 42. When the crosshead begins its forward movement, however, the solenoid assembly 42 is again energized as the trigger 126 moves out of contact with the button 125. The solenoid assembly 42 remains energized for substantially the full stroke of the crosshead 23 and is not de-energized until the trigger 126 again makes contact with the button 125.

The sheet 15 is transported by the suction cups 18 from the position of the stack 13 to the position shown in Figure 18. During this forward motion one edge 128 of the sheet 15 rides along the upper surface of the stationary guide rail 129, as shown in Figure 16. In this way the sheet is held out of contact with the upstanding pins 16 until it reaches the end of its depositing position.

When the crosshead 23 reaches the forward end of its travel, corresponding to the depositing position, the nose 130 of the cam 131 on the rotary shaft 29' (Figure 8) engages the follower 132 and actuates the switch 133 to energize the solenoid assembly 135 through wires 134. The lower end of the armature 136 (Figure 7) of this solenoid assembly 135 is connected to a crossmember 137 having a pair of posts 138 extending downward from its ends. The posts 138 are slidably received in apertures provided in a stationary guide plate 139 carried on the frame 10. Coil springs 140 encircle the posts 138 and extend between the crossmember 137 and the guide plates 139, serving to apply a lifting force to the armature 136. Each post 138 has a collar 141 fixed thereto below the guide plate 139 serving to limit upward travel of the posts. A presser foot 142 is fixed to the lower end of each post 138 and provides side-opening apertures 143 which provide clearance for the upstanding pins 16 (Fig. 18).

When the switch 133 energizes the solenoid 135, the springs 140 are compressed as the posts 138 are driven downward by the armature 136 to move the presser foot 142 to the position shown in Figure 17. Lowering of the presser foot 142 causes the edge 128 of the sheet 15 to bend past the edge of the stationary guide rail 129 and to rest flat on the previously deposited sheets in the shingled strip 12, the trailing edge of the sheet resting directly upon the table surface 11.

Each sheet (check) is provided with a series of apertures 145 which are engaged by the upstanding pins 16. The pins 16 advance the shingled strip 12 in step-by-step fashion for each stroke of the crosshead 23. Each sheet, therefore, overlaps the adjacent sheets in echelon formation, and the spots of adhesive hold each sheet to its neighbor.

The longitudinal position of the presser foot 142 may be adjusted by means of the screw 146 which engages a supporting element 147 of the solenoid assembly 135. The supporting elements 147 and 148 serve to mount the solenoid assembly 135 on the vertically spaced stationary guide rods 149 and 150.

A guide plate 151 (Fig. 1) may be supported upon the table 11 by means of the support strip 152 and piano hinge 153. The guide plate 151 may be formed as two parallel sections connected by spacer fastenings 154 above the level of the top of the upstanding pins 16, and thereby providing a central clearance slot 155 for the pins 16. The guide plate 151 serves to hold the sheets in the shingled strip 12 in contact with the table surface 11.

Means are provided for automatically raising the platform 14 so as to maintain the top of the stack 13 at a substantially constant elevation. As shown in the drawings (Fig. 2), this means includes the rock shaft 100 which is oscillated by the crank arm 99 and rod 98. This rock shaft 100 is mounted in spaced bearings 155 and 155a mounted upon the frame 10. A second crank arm 156 on the rock shaft 100 is pivotally connected by a link 157 to the pin 158 fixed on the tube 159 (Figure 12). The tube 159 is slidably guided within the stationary shell 160 fixed on the frame 10. A compression spring 161 within the tube 159 engages a shoulder 162 at one end and engages the upper end of a plunger 163 at the other. The plunger 163 is slidably mounted within the tube 159 and carries a pin 164 which rides in a slot 165 in the side of the tube 159. A contact button 166 is fixed on the lower end of the plunger 163 and engages the top sheet in the stack 13.

A crank arm 167 is connected to the pin 164 by means of the pivoted link 168, and this crank arm 167 is fixed on the rock shaft 169. The rock shaft 169 is supported in spaced bearings 170 and 155a and is connected to rod 171 by means of crank arm 172.

When a sufficient number of sheets have been withdrawn from the top of the stack 13 to lower the top level thereof appreciably, the button 166 moves downward under action of the spring 161, carrying the pin 164 downward with it. Downward motion of the pin 164 carries the link 168 to move the crank arm 167 to turn the rock shaft 169 in a clockwise direction, as viewed in Figure 7. This motion of the rock shaft 169 causes the crank arm 172 to move the rod 171 downward and thereby actuate the ratchet mechanism 173. This turns the shaft 174 and causes it to raise the posts 175 which support the platform 14. The mechanisms 176 which enable the shaft 174 to raise (or lower) the posts 175 are conventional in design and operation. A crank 177 on the shaft 174 may be operated manually when desired to raise or lower the platform 14.

Having fully described my invention it is to be understood that I am not to be limited to the details herein set forth but that my invention is of the full scope of the appended claims.

I claim:

1. A device for use in forming a shingled strip from a stack of sheets, comprising in combination: a frame having a table surface, a pair of longitudinally extending horizontal parallel guides fixed on said frame at one side thereof, a crosshead mounted to move longitudinally on said guides, a laterally extending bar fixed to the crosshead and extending toward the other side of the fame, a transfer member mounted for vertical movement on said bar, a sheet gripping device mounted on the transfer member, means for reciprocating the crosshead on said guides from a first position overlying the stack of sheets to a second position overlying the table surface on which a sheet is to be deposited, means carried on said bar adapted to move the transfer member vertically at the first position of the sheet gripping device for lifting a sheet from the stack, a pressure foot engageable with a sheet carried by the sheet gripping device at the second position of the sheet gripping device, and means for actuating said pressure foot to engage the sheet for depositing same on the table surface when the sheet gripping device has been moved to its second position.

2. A device for use in forming a shingled strip from a stack of sheets, comprising in combination: a frame having a table surface, a pair of longitudinally extending hoizontal parallel guides fixed on said frame at one side thereof, a crosshead mounted to move longitudinally on said guides, a laterally extending bar fixed to the crosshead and extending toward the other side of the frame, a transfer member mounted for vertical movement on said bar, a sheet gripping device mounted on the transfer member, means for reciprocating the crosshead on said guides from a first position overlying the stack of sheets to a second position overlying the table surface on which a sheet is to be deposited, means including an electrically operated solenoid assembly carried on said bar and adapted to move the transfer member vertically at the first position of the sheet gripping device for lifting a sheet from the stack, a pressure foot engageable with a sheet carried by the sheet gripping device at the second position of the sheet gripping device, and means for actuating said pressure foot to engage the sheet for depositing same on the table surface when the sheet gripping device has been moved to its second position.

3. A device for use in forming a shingled strip from a stack of sheets, comprising in combination: a frame having a table surface, a pair of longitudinally extending horizontal parallel guides fixed on said frame at one side thereof, a crosshead mounted to move longitudinally on said guides, a laterally extending bar fixed to the crosshead and extending toward the other side of the frame, a transfer member mounted for vertical movement relative to said bar, a sheet gripping device including suction cups mounted on the transfer member, means for reciprocating the crosshead on said guides, means including an electrically operated solenoid assembly carried on said bar adapted to move the transfer member vertically whereby coordinated motions of the crosshead and solenoid assembly may serve to move the transfer member from a first position in which the sheet gripping device rests on the top sheet in the stack to a second position in which the sheet gripping device deposits the said sheet on said table surface, a pressure foot engageable with the said sheet at the second position of the sheet gripping device, and means for actuating said pressure foot to engage said sheet for depositing same on the table surface when the sheet gripping device has been moved to its second position.

4. A device for use in forming a shingled strip from a stack of sheets, comprising in combination: a frame having a table surface, a pair of longitudinally extending horizontal parallel guides fixed on said frame at one side thereof, a crosshead mounted to move longitudinally on said guides, a laterally extending bar fixed to the crosshead and extending toward the other side of the frame, a post mounted for vertical movement on said bar, a carrier fixed to the post, a plurality of suction cups mounted for vertical sliding movement on the carrier, power means for reciprocating the crosshead on said guides, electrically operated means carried on said bar adapted to move the post vertically, whereby the carrier may be moved from a first position in which the suction cups rest on the top sheet in the stack to a second position in which the sheet is deposited upon said table surface, means including a valve assembly on the frame for applying suction pressure to said cups at said first position and for supplying positive air pressure to said cups at said second position, a pressure foot engageable with the said sheet at the second position of the sheet gripping device, and means for actuating said pressure foot to engage said sheet for depositing same when the sheet gripping device has been moved to its second position.

5. A device for use in forming a shingled strip from a stack of sheets, comprising in combination: a frame having a table surface, a pair of longitudinally extending horizontal parallel guides fixed on said frame at one side thereof, a crosshead mounted to move longitudinally on said guides, a laterally extending bar fixed to the crosshead and extending toward the other side of the frame, a post mounted for vertical movement on said bar, a carrier fixed to the post, a plurality of suction cups mounted for vertical sliding movement on the carrier, power means for reciprocating the crosshead on said guides, a vertical guide member fixed to said frame adjacent to the position of the stack of sheets, an adhesive applicator mounted on said vertical guide member to overlie the stack of sheets, means for vertically reciprocating said adhesive applicator to apply adhesive to the uppermost sheet in the stack, means for restraining a reciprocation of the adhesive applicator after a predetermined number of reciprocations, electrically operated means carried on said bar adapted to move the post vertically, whereby the carrier may be moved from a first position in which the suction cups rest on the top sheet in the stack to a second position in which the sheet is deposited upon said table surface, and means including a valve assembly on the frame for applying suction pressure to said cups at said first position and for supplying positive air pressure to said cups at said second position.

References Cited in the file of this patent
UNITED STATES PATENTS

| | | |
|---|---|---|
| 1,440,856 | Wescott | Jan. 2, 1923 |
| 2,167,470 | West | July 25, 1939 |
| 2,627,809 | Worth | Feb. 10, 1953 |